(12) United States Patent  (10) Patent No.: US 7,594,404 B2
Somanath et al.  (45) Date of Patent: Sep. 29, 2009

(54) EMBEDDED MOUNT FOR MID-TURBINE FRAME

(75) Inventors: Nagendra Somanath, Manchester, CT (US); Keshava B. Kumar, South Windsor, CT (US); William A. Sowa, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 421 days.

(21) Appl. No.: 11/494,032

(22) Filed: Jul. 27, 2006

(65) Prior Publication Data

US 2008/0022692 A1  Jan. 31, 2008

(51) Int. Cl.
*F02C 7/20* (2006.01)

(52) U.S. Cl. ........................ 60/796; 60/226.1; 415/213.1

(58) Field of Classification Search ............... 60/226.1, 60/791, 796, 797; 415/213.1, 142, 229, 191, 415/208.2, 209.2, 210.1; 248/560, 575, 604, 248/605, 618, 621, 637, 638, 676
See application file for complete search history.

(56) References Cited

U.S. PATENT DOCUMENTS

| 3,708,242 | A | * | 1/1973 | Bruneau et al. | ........... 415/209.4 |
| 4,428,713 | A | * | 1/1984 | Coplin et al. | ................. 415/48 |
| 5,249,418 | A | * | 10/1993 | Finn | ............................ 60/797 |
| 6,217,282 | B1 | * | 4/2001 | Stanka | .................... 415/209.2 |
| 6,708,482 | B2 | | 3/2004 | Seda | |
| 6,883,303 | B1 | | 4/2005 | Seda | |

* cited by examiner

*Primary Examiner*—Michael Cuff
*Assistant Examiner*—Phutthiwat Wongwian
(74) *Attorney, Agent, or Firm*—Kinney & Lange, P.A.

(57) ABSTRACT

An engine casing for a mid-turbine frame having a plurality of radially extending struts includes a ring structure and at least one mount. The ring structure has an interior surface, an exterior surface, and a plurality of equally spaced dimples along the exterior surface and protruding from the interior surface. The ring structure is connected to each of the plurality of struts at the interior surface at the dimples. The mount is positioned within each of the dimples and transfers load to the engine casing.

8 Claims, 3 Drawing Sheets

US 7,594,404 B2

EMBEDDED MOUNT FOR MID-TURBINE FRAME

BACKGROUND OF THE INVENTION

The present invention generally relates to the field of gas turbine engines. In particular, the invention relates to an engine casing for a jet turbine engine.

Turbofans are a type of gas turbine engine commonly used in aircraft, such as jets. The turbofan generally includes a high and a low pressure compressor, a high and a low pressure turbine, a high pressure rotatable shaft, a low pressure rotatable shaft, a fan, and a combuster. The high-pressure compressor (HPC) is connected to the high pressure turbine (HPT) by the high pressure rotatable shaft, together acting as a high pressure system. Likewise, the low pressure compressor (LPC) is connected to the low pressure turbine (LPT) by the low pressure rotatable shaft, together acting as a low pressure system. The low pressure rotatable shaft is housed within the high pressure shaft and is connected to the fan such that the HPC, HPT, LPC, LPT, and high and low pressure shafts are coaxially aligned.

Outside air is drawn into the jet turbine engine by the fan and the HPC, which increases the pressure of the air drawn into the system. The high-pressure air then enters the combuster, which burns fuel and emits the exhaust gases. The HPT directly drives the HPC using the fuel by rotating the high pressure shaft. The LPT uses the exhaust generated in the combuster to turn the low pressure shaft, which powers the fan to continually bring air into the system. The air brought in by the fan bypasses the HPT and LPT and acts to increase the engine's thrust, driving the jet forward.

In order to support the high and low pressure systems, bearings are located within the jet turbine engine to help distribute the load created by the high and low pressure systems. The bearings are connected to an engine casing that houses a mid-turbine frame located between the HPT and the LPT by bearing support structures. The bearing support structures can be, for example, bearing cones. The load from the bearing support structures are transferred to the engine casing through the mid-turbine frame. Decreasing the weight of the engine casing can significantly increase the efficiency of the jet turbine engine and the jet itself.

BRIEF SUMMARY OF THE INVENTION

An engine casing for a mid-turbine frame having a plurality of radially extending struts includes a ring structure and at least one mount. The ring structure has an interior surface, an exterior surface, and a plurality of equally spaced dimples along the exterior surface and protruding from the interior surface. The ring structure is connected to each of the plurality of struts at the interior surface at the dimples. The mount is positioned within each of the dimples and transfers load to the engine casing.

DETAILED DESCRIPTION

Figure 1:
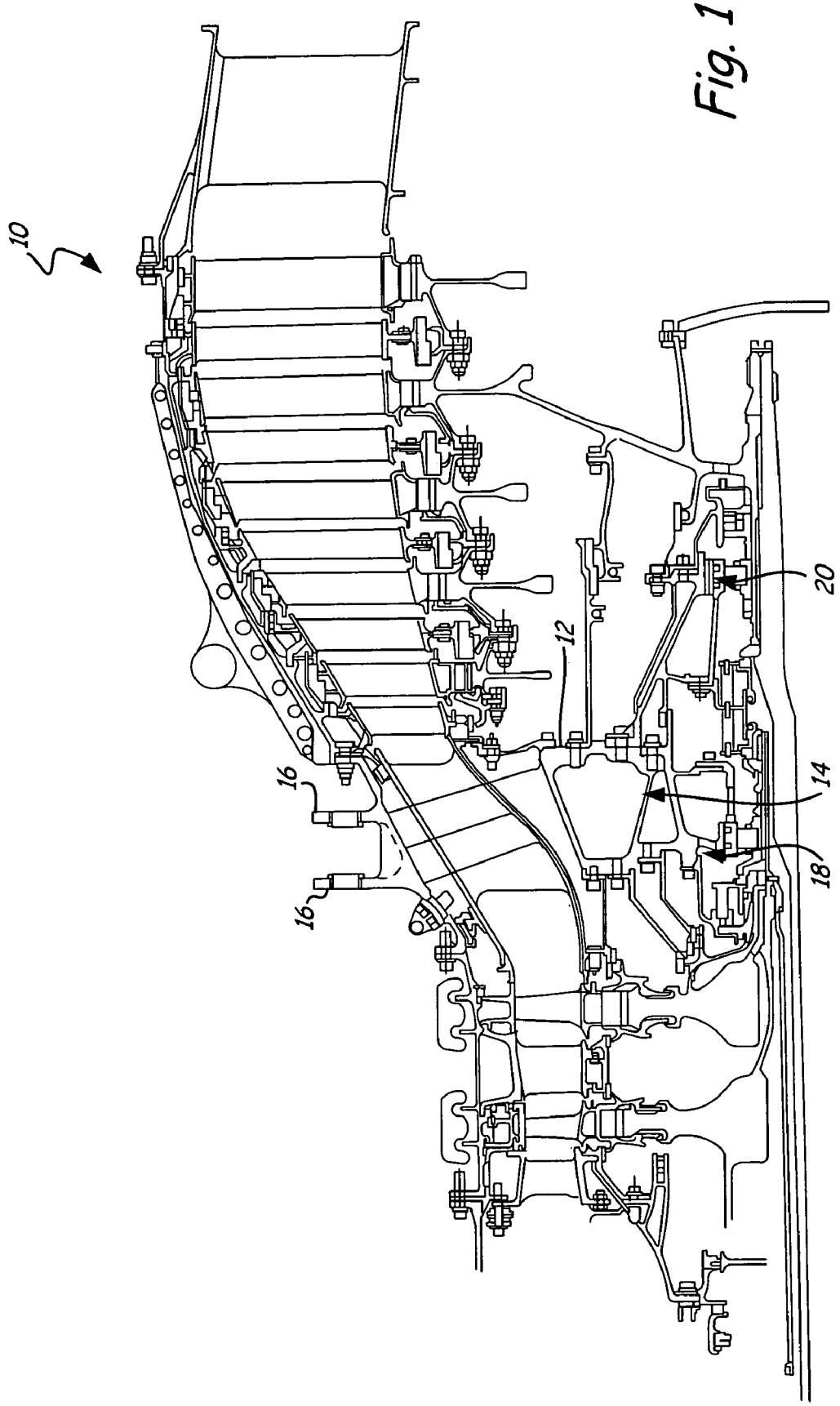
FIG. 1 is a partial sectional view of an intermediate portion of a gas turbine engine.

FIG. 1 shows a partial sectional view of an intermediate portion of a gas turbine engine 10 about a gas turbine engine axis centerline. Gas turbine engine 10 generally includes engine casing 12, mid-turbine frame 14, mounts 16, first bearing 18, and second bearing 20. Engine casing 12 of gas turbine engine 10 has a lightweight design that efficiently transfers loads from first and second bearings 18 and 20 through mid-turbine frame 14 to mounts 16. The design of engine casing 12 also allows duel load transfer points and enables membrane load transfer, providing load equilibrium through engine casing 12 to mounts 16.

Engine casing 12 houses mid-turbine frame 14 and protects mid-turbine frame 14 from its surroundings. Engine casing 12 functions to transfer the loads from mid-turbine frame 14 to mounts 16. The structure of engine casing 12 does not require rails, giving engine casing 12 a lightweight and cost-effective structure. Additionally, the elimination of rails reduces the drag on engine casing 12. In one embodiment, engine casing 12 weighs between approximately 15% and approximately 22% less than a conventional engine casing. In one embodiment, engine casing 12 weighs less than approximately 160 pounds. In one embodiment, engine casing 12 weighs between approximately 140 pounds and approximately 150 pounds.

Mid-turbine frame 14 is housed within engine casing 12 and is connected to engine casing 12 and first and second bearings 18 and 20. Mid-turbine frame 14 transfers the loads from first and second bearings 18 and 20 to engine casing 12 and mounts 16.

First and second bearings 18 and 20 are located at forward and aft ends of gas turbine engine 10, respectively, below engine casing 12. First and second bearings 18 and 20 support thrust loads, vertical tension, side gyroscopic loads, as well as vibratory loads from high and low pressure rotors located in gas turbine engine 10. All of the loads supported by first and second bearings 18 and 20 are transferred to engine casing 12 and mounts 16 through mid-turbine frame 14.

Figure 2:
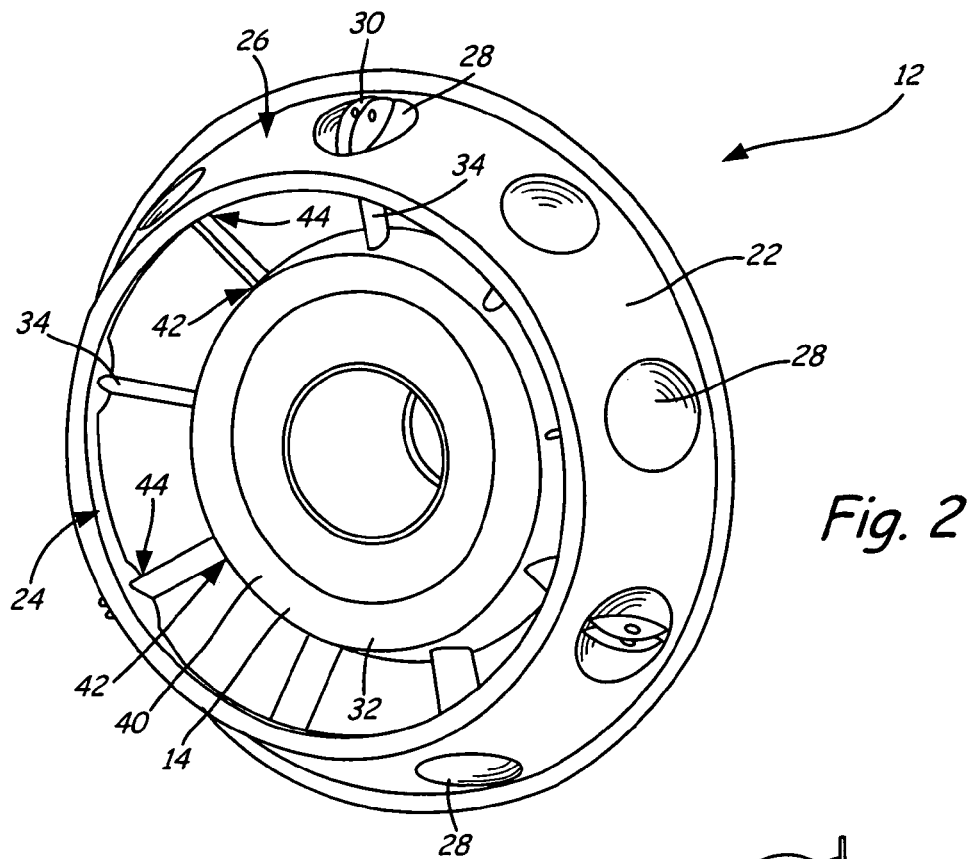
FIG. 2 is an enlarged perspective view of an engine casing having embedded mounts.
Figure 3:
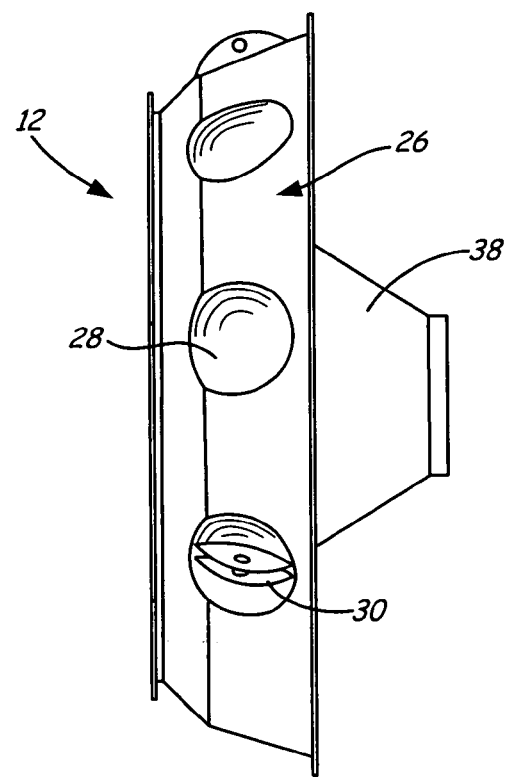
FIG. 3 is a side view of the engine casing.

FIGS. 2 and 3 show an enlarged perspective view of engine casing 12 housing mid-turbine frame 14 and a side view of engine casing 12, respectively, and will be discussed in conjunction with one another. Engine casing 12 generally includes ring structure 22 having interior surface 24, exterior surface 26, and dimples 28. The area between interior surface 24 and exterior surface 26 gives ring structure 22 a height, $H_{ring}$. Dimples 28 are equally spaced apart along the circumference of ring structure 22 and are located between interior surface 24 and exterior surface 26, creating indentations at exterior surface 26 and protrusions at interior surface 24. Dimples 28 provide localized strength and stiffen engine casing 12 by increasing the resistance to bending, leading to efficient multi-directional load transfer from mid-turbine frame 14 to engine casing 12. In one embodiment, dimples 28 have a height $H_{dimples}$ of between approximately one times and approximately three times height $H_{ring}$ of ring structure 22. Engine casing 12 also includes embedded mounts 30 positioned within dimples 28.

Mounting flanges 30 are embedded within dimples 28 and eliminate the need for rails. Because mounting flanges 30 are embedded within dimples 28, mounting flanges 30 enable localized load paths directly to engine casing 12 and provide efficient load and stress distribution in combination with the stiffening effect of dimples 28 on engine casing 12. Mounting flanges 30 also serve to connect engine casing 12 to mounts 16 (shown in FIG. 1). Mounting flanges 30 have a height at least equal to height $H_{dimples}$ of dimples 28 to ensure that mounting flanges 30 can adequately act as load transfer means to mounts 16. In one embodiment, engine casing 12 includes at least three mounting flanges 30.

Mid-turbine frame 14 generally includes torque box 32 and plurality of struts 34. First and second bearings 18 and 20 (shown in FIGS. 1 and 5) are connected to mid-turbine frame 14 by first bearing cone 36 and second bearing cone 38 (shown in FIG. 5), respectively. First and second bearings cones 36 and 38 are continuously rotating with high and low pressure rotors of gas turbine engine 10 (shown in FIG. 1) and transfer the loads from first and second bearings 18 and 20 to mid-turbine frame 14.

Torque box 32 has a ring structure 40 and is positioned between first and second bearing cones 36 and 38 and struts 34. Torque box 32 takes the loads, or torque, from first and second bearing cones 36 and 38 and combines them prior to transferring the loads to struts 34, which extend from the circumference of torque box 32.

Struts 34 of mid-turbine frame 14 extend from torque box 32 of mid-turbine frame 14 and transfer the loads from first and second bearing cones 36 and 38 entering through torque box 32 to engine casing 12. Each of struts 34 has a first end 42 connected to torque box 32 and a second end 44 connected to engine casing 12. The loads from first and second bearings 36 and 38 travel from torque box 32 through struts 34 to engine casing 12. In one embodiment, dimples 28 and struts 34 are equal in number such that each strut 34 is connected to engine casing 12 at a different dimple 28. In one embodiment, struts 34 have an elliptical shape and are sized to take a load and transfer it in a vertical direction toward engine casing 12. In one embodiment, nine struts are positioned approximately forty degrees apart from one another along the circumference of torque box 32. In another embodiment, twelve total struts are positioned approximately thirty degrees apart from one another along the circumference of torque box 32.

Figure 4:
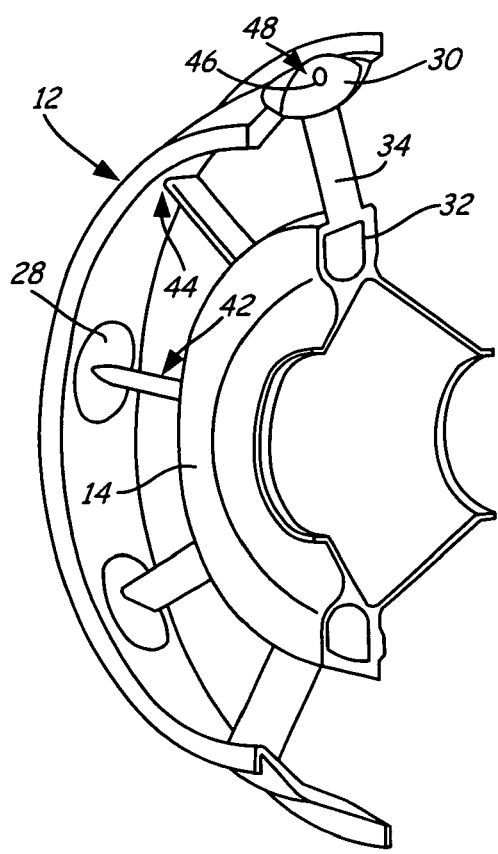
FIG. 4 is a cross-sectional perspective view of the engine casing.
Figure 5:
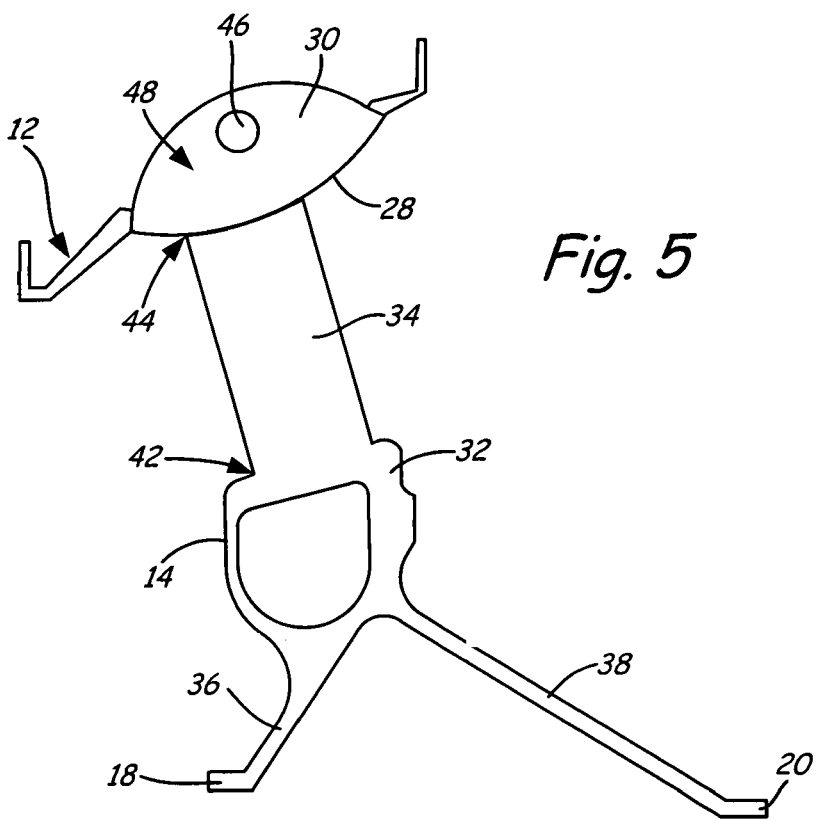
FIG. 5 is a cross-sectional perspective view of a segment of the engine casing.

FIGS. 4 and 5 show a cross-sectional perspective view and a schematic diagram of engine casing 12 and mid-turbine frame 14, respectively, and will be discussed in conjunction with one another. As can be seen in FIGS. 4 and 5, struts 34 of mid-turbine frame 14 connect mid-turbine frame 14 to engine casing 12. Second end 44 of struts 34 are connected to interior surface 24 of engine casing 12 at the protrusions caused by dimples 28. Because struts 34 connect to engine casing 12 at the protrusions caused by dimples 28, the overall length of struts 34 is decreased. The shortened length of struts 34 between dimple 28 and torque box 32 increases the critical buckling load as well as the load carrying capacity of struts 34. In addition to the shortened length, struts 34 may also be hollow, further reducing the weight of mid-turbine frame 14. When coupled with struts 34, dimples 28 act as local stiffeners and lead to increased local membrane-bending stiffness. Struts 34 have a minor axis $A_{minor1}$ and a major axis $A_{major1}$ and dimples 28 have a minor axis $A_{minor2}$ and a major axis $A_{major2}$. In one embodiment, minor axis $A_{minor2}$ of dimples 28 is approximately equal to minor axis $A_{minor1}$ of struts 34 and major axis $A_{major2}$ of dimples 28 is approximately two times major axis $A_{major1}$ of struts 34.

Mounting flanges 30 are positioned within dimples 28 to connect engine casing 12 to mounts 16. The combination of dimples 28 and mounting flanges 30 embedded within dimples 28 adds stiffness to engine casing 12 and creates a higher load carrying capacity for engine casing 12. Embedded mounting flanges 30 enable local stress redistribution and transfer to a stiffer engine casing 12. Hole 46 is located at a top portion 48 of each of mounting flanges 30 to resolve mount loads from first and second bearings 18 and 20.

The loads are transferred from first and second bearings 18 and 20 through first and second bearing cones 36 and 38, respectively, and combine at torque box 32 and struts 34 of mid-turbine frame 14. Struts 34 then carry the loads to dimples 28 and mounting flanges 30 of engine casing 12. The U-shaped design of both torque box 32 and dimples 28 provide dual U-load transfer points, allowing efficient load transfer through mid-turbine frame 14 and engine casing 12 to mounting flanges 30 and mounts 16. The U-structure is beneficial because of the membrane bending efficiency of shell structures, reducing the overall weight of engine casing 12. Although FIGS. 4 and 5 depict torque box 32 of mid-turbine frame 14 as a U-shaped torque box design, engine casing 12 can be used with any mid-turbine frame design without departing from the scope of the invention.

The engine casing design with embedded mounts offers a lightweight structure that efficiently distributes load from a first and second bearing to a pair of engine mounts. The loads from the first and second bearings first pass through a mid-turbine frame having a plurality of struts that attach the mid-turbine frame to the engine casing. The engine casing includes a ring structure with a plurality of dimples equally spaced around the circumference of the ring structure. Each of the struts of the mid-turbine frame connects to the engine casing at one of the dimples. The dimples provide localized stiffening of the engine casing as well as multi-directional load transfer. In addition, the dimples eliminate the need for rails and shorten the length of the struts, reducing the overall weight of the engine casing.

Although the present invention has been described with reference to preferred embodiments, workers skilled in the art will recognize that changes may be made in form and detail without departing from the spirit and scope of the invention.

The invention claimed is:

1. An engine casing assembly comprising:
   a mid-turbine frame;
   a ring structure having an interior surface and an exterior surface, wherein the ring structure has a plurality of dimples forming indentations at the exterior surface and protrusions at the interior surface;
   a plurality of struts, each strut having a first end and a second end, wherein the first end of each strut is connected to the mid-turbine frame and the second end of each strut is connected to the inner surface of the ring structure at one of the dimples; and at least one mounting flange positioned within each of the dimples for transferring load to a mount.

2. The engine casing assembly of claim 1, wherein the ring structure has a thickness, and wherein each of the dimples has a thickness of at least the thickness of the ring structure.

3. The engine casing assembly of claim 2, wherein each of the dimples has a thickness of less than three times the thickness of the ring structure.

4. The engine casing assembly of claim 1, and further comprising at least three mounting flanges.

5. The engine casing assembly of claim 1, wherein each of the struts has a minor axis and a major axis and each of the dimples has a minor axis and a major axis, and wherein the minor axis of the dimple is at least the minor axis of the strut.

6. The engine casing assembly of claim 5, wherein the major axis of the dimple is up to three times the major axis of the strut.

7. The engine casing assembly of claim 1, wherein the engine casing has a weight of between approximately 140 pounds and approximately 150 pounds.

8. The engine casing assembly of claim 1, wherein the dimples have a first height and the mounting flanges have a second height, and wherein the second height is larger than the first height.

* * * * *